I. B. Arthur.
Scroll-Sawing Mach.
No. 88,114. Patented Mar. 23, 1869.
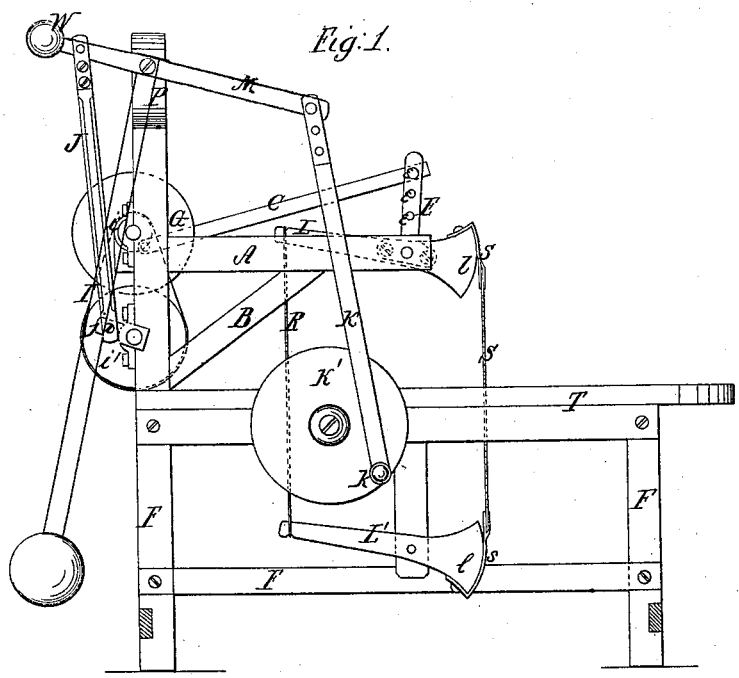
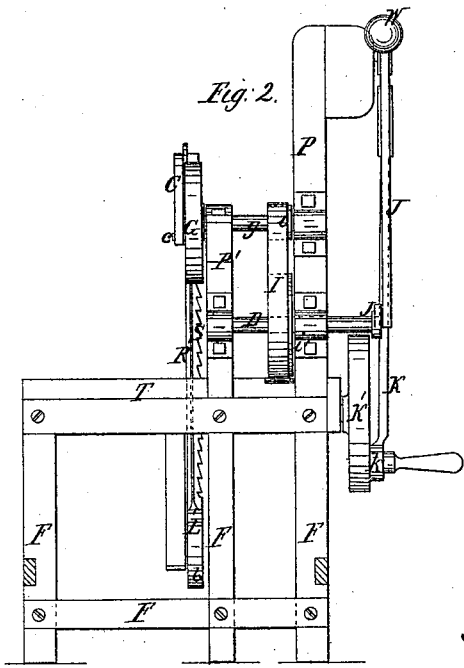

ISAIAH B. ARTHUR, OF SIDONSBURG, PENNSYLVANIA.

Letters Patent No. 88,114, dated March 23, 1869.

IMPROVEMENT IN GIG-SAWS.

The Schedule referred to in these Letters Patent and making part of the same.

*To all whom it may concern:*

Be it known that I, ISAIAH B. ARTHUR, of Sidonsburg, in the county of York, and State of Pennsylvania, have invented a new and improved "Gig-Saw;" and I do hereby declare the following to be a full, clear, and exact description of the construction and operation of the same, in such terms as to enable a person skilled in the art to manufacture and work the same, reference being had to the annexed drawings, in which—

Figure 1 is a side view, and

Figure 2, an end view.

This invention has for its object a new and improved arrangement of the parts by which a gig-saw is put in motion, whereby the machine is rendered easier of operation than heretofore.

In the drawings, T is the table, supported upon a frame, F, and provided at one end with one long standard, P, and one short one, P', the latter having a stout arm, A, attached to its upper end, and projecting forward over the centre of the table, being supported and strengthened by suitable braces R.

S is the saw, supported by two levers, L L', provided with heads l l, in the form of a segment of a circle, the centre of which is at the fulcrum of the levers, or beams L L', the saw being attached to the levers by flexible straps s s, which pass over the convex end of the levers, this arrangement being adopted for the purpose of causing the saw to move in a perfectly vertical line.

The opposite ends of the levers L L' are united by an adjustable rod, chain, or strap, R, by which any required tension may be given to the saw.

The saw being thus hung, motion is imparted to it by means of an upright arm, E, affixed to the upper lever L at its fulcrum, and by rocking which back and forth horizontally, the levers will be rocked, and the saw vibrated vertically.

C is a pitman, extending from the upper end of the arm E to a wrist-pin, c, on the side of a wheel, G.

The connection between the pitman and the arm E may be varied, by means of a series of holes e e e, in the arm, so as to adjust the stroke of the saw to any required length.

The wheel G, and its shaft g, receive motion from a shaft D, likewise supported by the standard P P', as seen in fig. 2, the connection between the two shafts being effected by means either of a belt, I, and pulleys i i', or by cog-gearing, if preferred.

The shaft D is operated from a lever, or "working-beam," M, pivoted to the upper end of standard P, as shown in fig. 1, the connection between the shaft and the working-beam being effected by means of a pitman, J, and crank j, as shown in fig. 1.

The working-beam may be operated by a treadle, by a pitman, K, wheel K', and wrist-pin k, or by a weighted pendulum, affixed rigidly to it at its fulcrum, as shown by the blue lines in fig. 1. In the latter case the parts K K' k could be omitted.

When the parts are not omitted, the working-beam is to be provided with a weight, w, sufficient to counterbalance the parts attached to its opposite end, and cause all the parts to run smoothly and evenly.

The wheel G is made of metal, very heavy, to act as a fly-wheel. It may be so constructed that it will also operate as a belt-pulley, in which case a circular saw could be mounted at any convenient point on the table, and operated by a belt running from this wheel.

I do not claim as my invention, the several parts of this machine, considered independently; nor do I claim any arrangement or combination of a portion thereof, without all the others, as specified in the claim hereto annexed. Especially, I do not claim the arrangement of parts shown in the machine patented by John C. Clines, April 6, 1858, nor in that which forms the subject of O. Boughton's rejected application, filed April 18, 1854; but What I do claim as my invention, and desire to secure by Letters Patent, is—

The arrangement of the adjustable strap R, the saw S, attached to the levers by flexible straps s s, the levers L L', having segment-heads l l, the working-beam M, provided with a counter-balance, w, arranged upon its end, the shaft D, the crank j, the pitman J, the weighted wheel G, the pitman C, the arm E, having an adjustable connection with pitman C, and rigidly affixed to lever L at its fulcrum, the belt I, the adjustable pitman K, the wheel K', and the frame F, table T, post P, arm A, and brace B, all constructed, connected, arranged, and adapted to each other, to operate together in the manner and for the purposes set forth.

ISAIAH B. ARTHUR.

Witnesses:
JOSEPH LEAS,
PETER COCKLIN.